United States Patent
Brown

(10) Patent No.: US 10,875,585 B2
(45) Date of Patent: Dec. 29, 2020

(54) CAP ASSEMBLIES FOR TRUCK BED SIDEWALLS INCLUDING ADAPTOR ASSEMBLIES WITH ACCESSORY CHANNELS

(71) Applicant: Dee Zee, Inc., Des Moines, IA (US)

(72) Inventor: Eli Brown, Ames, IA (US)

(73) Assignee: Dee Zee, Inc., Des Moines, IA (US)

(*) Notice: Subject to any disclaimer, the term of this patent is extended or adjusted under 35 U.S.C. 154(b) by 102 days.

(21) Appl. No.: 16/171,833

(22) Filed: Oct. 26, 2018

(65) Prior Publication Data

US 2019/0126994 A1    May 2, 2019

Related U.S. Application Data

(60) Provisional application No. 62/577,944, filed on Oct. 27, 2017.

(51) Int. Cl.
| | |
|---|---|
| B62D 33/02 | (2006.01) |
| B62D 27/06 | (2006.01) |
| B62D 33/023 | (2006.01) |
| B60J 7/16 | (2006.01) |
| B60P 7/08 | (2006.01) |

(52) U.S. Cl.
CPC ........ B62D 33/0207 (2013.01); B60J 7/1607 (2013.01); B60P 7/0815 (2013.01); B62D 27/065 (2013.01); B62D 33/023 (2013.01)

(58) Field of Classification Search
CPC .............. B62D 33/0207; B62D 27/065; B62D 33/023; B60J 7/1607; B60P 7/0815
See application file for complete search history.

(56) References Cited

U.S. PATENT DOCUMENTS

| | | |
|---|---|---|
| 5,259,711 A | 11/1993 | Beck |
| 5,921,603 A | 7/1999 | Karrer |
| 6,170,897 B1 | 1/2001 | Karrer |
| 2002/0048495 A1 | 4/2002 | Anderson |
| 2007/0110539 A1 | 5/2007 | Klinkman |

OTHER PUBLICATIONS

International Search Report and Written Opinion Relating to International Applicaiton No. PCT/US2018/057628, dated Jan. 29, 2019.

*Primary Examiner* — D Glenn Dayoan
*Assistant Examiner* — Melissa Ann Bonifazi
(74) *Attorney, Agent, or Firm* — Dinsmore & Shohl LLP

(57) ABSTRACT

A cap assembly for removably installing one or more accessories to a truck bed sidewall that may include a cap and an adaptor assembly. The adaptor assembly may include an accessory channel that may include a base wall, a pair of opposing sidewalls, and a top wall comprising retaining flanges that define a slot. The one or more accessory fasteners may comprise a fastening portion and a head portion. The accessory channel may be coupled to the cap, and the head portion of the accessory fastener may be slidably positioned within the accessory channel while the fastening portion may project through the slot for connection to the one or more accessories.

17 Claims, 14 Drawing Sheets

US 10,875,585 B2

CAP ASSEMBLIES FOR TRUCK BED SIDEWALLS INCLUDING ADAPTOR ASSEMBLIES WITH ACCESSORY CHANNELS

CROSS REFERENCE

This application claims the benefit of U.S. Provisional Patent Application Ser. No. 62/577,944 filed Oct. 27, 2017, and entitled "Cap Assemblies for Truck Bed Sidewalls Including Adaptor Assemblies with Accessory Channels," the entirety of which is incorporated by reference herein.

TECHNICAL FIELD

The present specification generally relates to cap assemblies for truck bed sidewalls and more particularly to cap assemblies for truck bed sidewalls including adaptor assemblies with accessory channels.

BACKGROUND

Truck beds may be adaptable to utilize various accessories. Certain of these accessories may be fixed to the truck bed sidewall. Conventional truck bed sidewall caps may not include built in channels for easily adapting these accessories. Accordingly, a need exists for cap assemblies for truck bed sidewalls including adaptor assemblies with accessory channels.

SUMMARY

Embodiments of the present disclosure are directed to a cap assembly for removably installing one or more accessories to a truck bed sidewall that may include a cap and an adaptor assembly. The adaptor assembly may include an accessory channel that may include a base wall, a pair of opposing sidewalls, and a top wall comprising retaining flanges that define a slot. The one or more accessory fasteners may comprise a fastening portion and a head portion. The accessory channel may be coupled to the cap, and the head portion of the accessory fastener may be slidably positioned within the accessory channel while the fastening portion may project through the slot for connection to the one or more accessories.

In another embodiment a method of removably coupling an accessory to a truck bed sidewall includes inserting one or more accessory fasteners within an accessory channel formed in a cap of a cap assembly on the truck bed sidewall, positioning the one or more accessory fasteners along the accessory channel at the appropriate location for installing the accessory, and installing the accessory at the accessory fastener.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure is generally directed to a cap assembly for truck bed sidewalls including an adaptor assembly with one or more accessory channels. The cap assembly may be made to removably affix to one or more truck bed accessories such as a truck bed covering using the one or more accessory channels. The accessory channels may be configured to slidably receive one or more accessory fasteners to removably affix the one or more truck bed accessories. The accessory fasteners may comprise a fastening portion and a head portion. The head portion may be disposed within the accessory channel and the fastening portion may extend upward from the accessory channel to removably affix the one or more accessories. The cap assembly may be manufactured and or assembled separately from the truck bed assembly and installed after the initial assembly of the vehicle.

Figure 1:
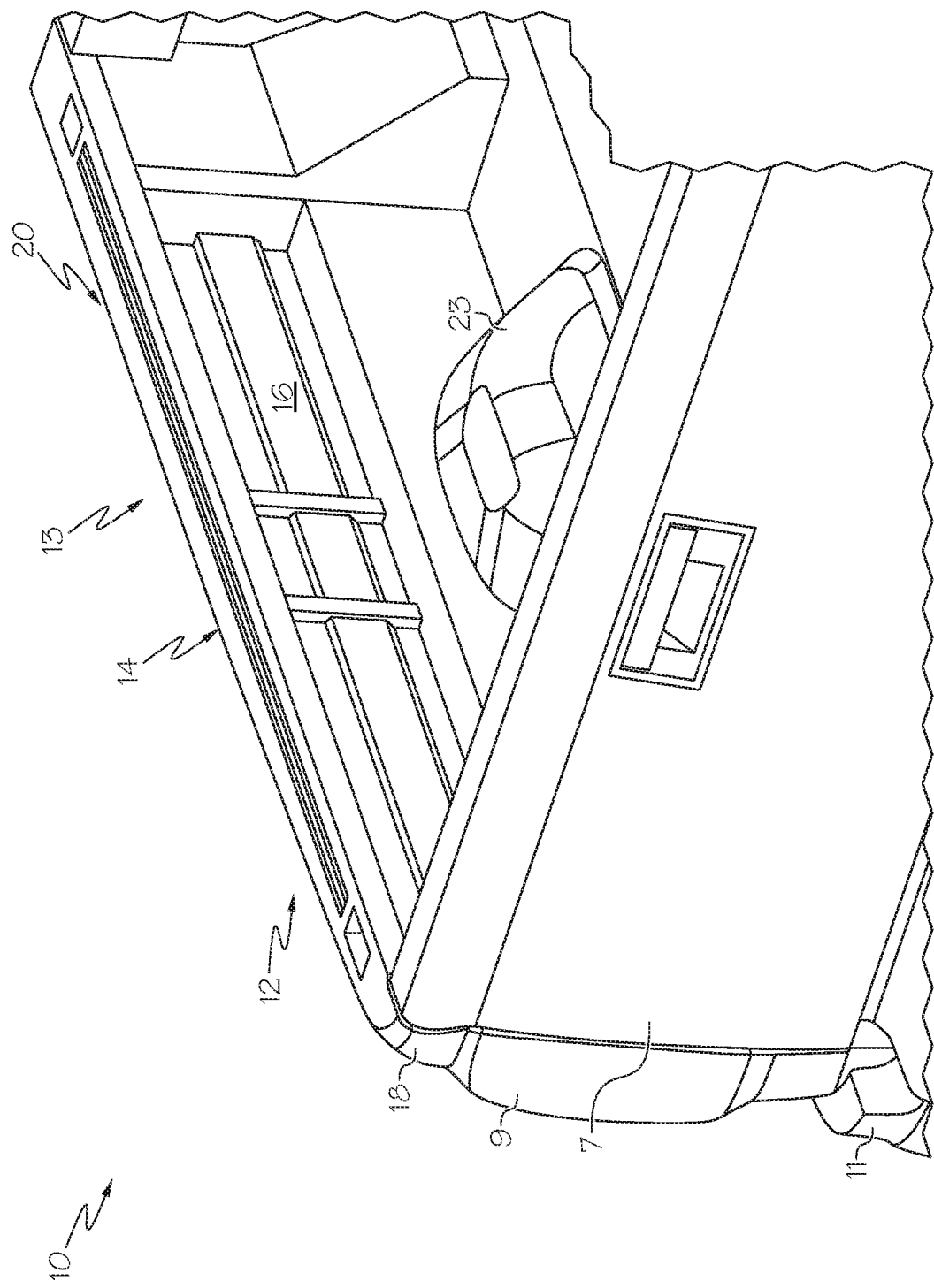
FIG. 1 depicts a perspective view of a vehicle that includes a truck bed and a cap assembly atop a truck bed sidewall, according to one or more embodiments shown and described herein.
Figure 2:
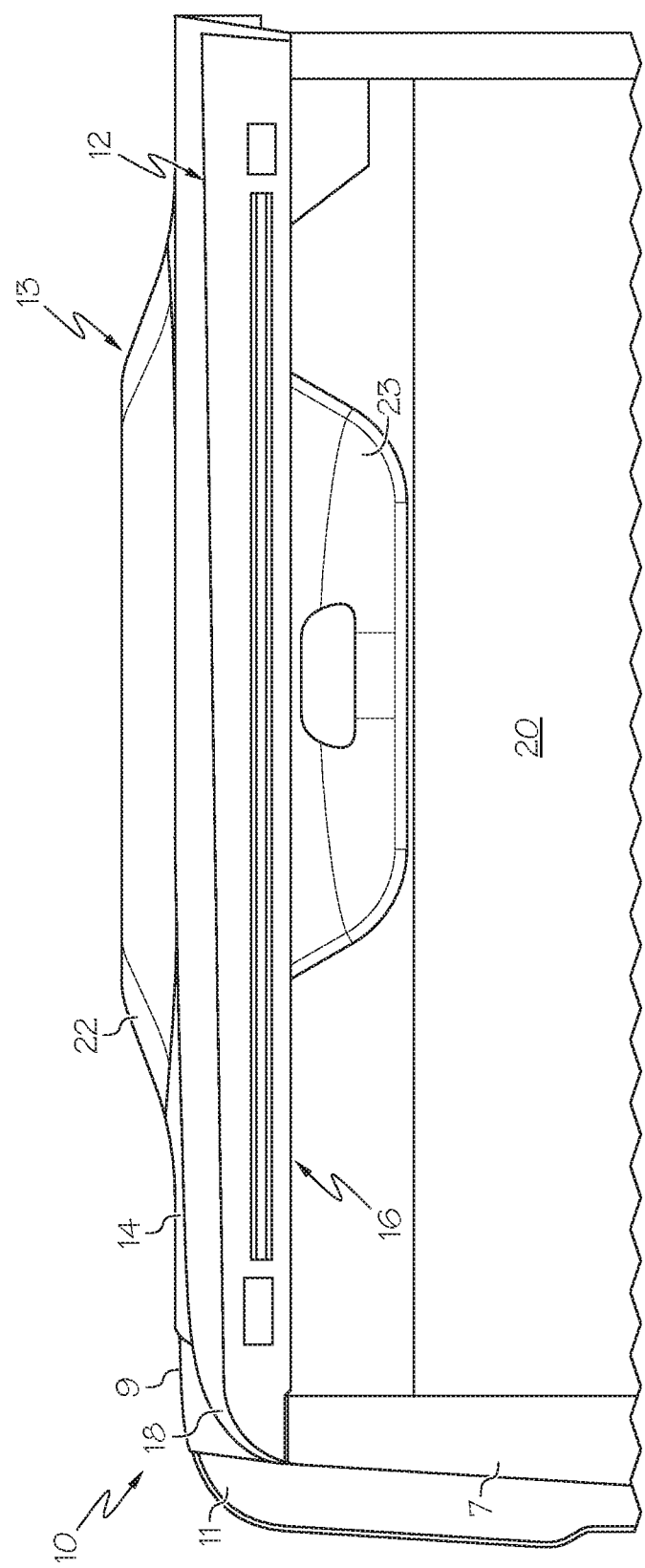
FIG. 2 depicts a top view of the vehicle of FIG. 1, according to one or more embodiments shown and described herein.

Referring now to FIGS. 1 and 2, a perspective view of a vehicle 10 that includes a truck bed 20 is illustrated. The vehicle 10 may include a tailgate 7, one or more tail lights 9, and a bumper 11. The vehicle 10 may also include a cap assembly 12 that caps a truck bed sidewall 13 of the vehicle 10. The truck bed sidewall 13 may include a fender 22 and a wheel well 23. The truck bed sidewall 13 may also include an exterior sidewall 14, an interior sidewall 16, and a rear sidewall 18. The truck bed sidewall 13 shown is on the left side of the vehicle 10 with reference to looking forward in the vehicle longitudinal direction, but the truck bed sidewall 13 may be substantially mirrored on the right side of the vehicle 10 across a vehicle centerline such that the vehicle 10 includes two opposite, substantially similar sidewalls, likewise the cap assemblies, adaptor assemblies, accessory channels, and related components described below.

Figure 3:
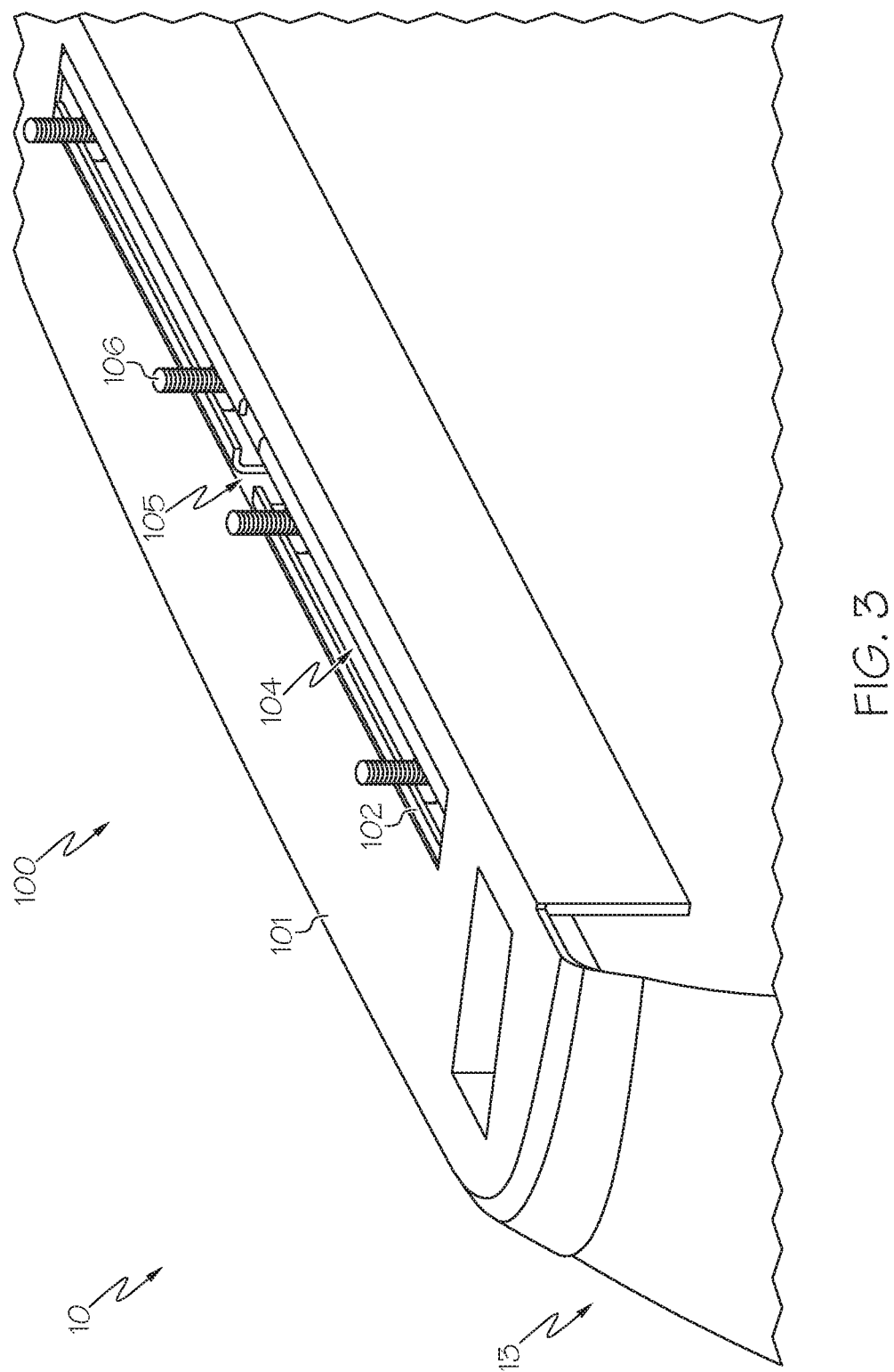
FIG. 3 depicts a perspective view of a cap assembly including an adaptor assembly with an accessory channel for the vehicle of FIG. 1, according to one or more embodiments shown and described herein.
Figure 4:
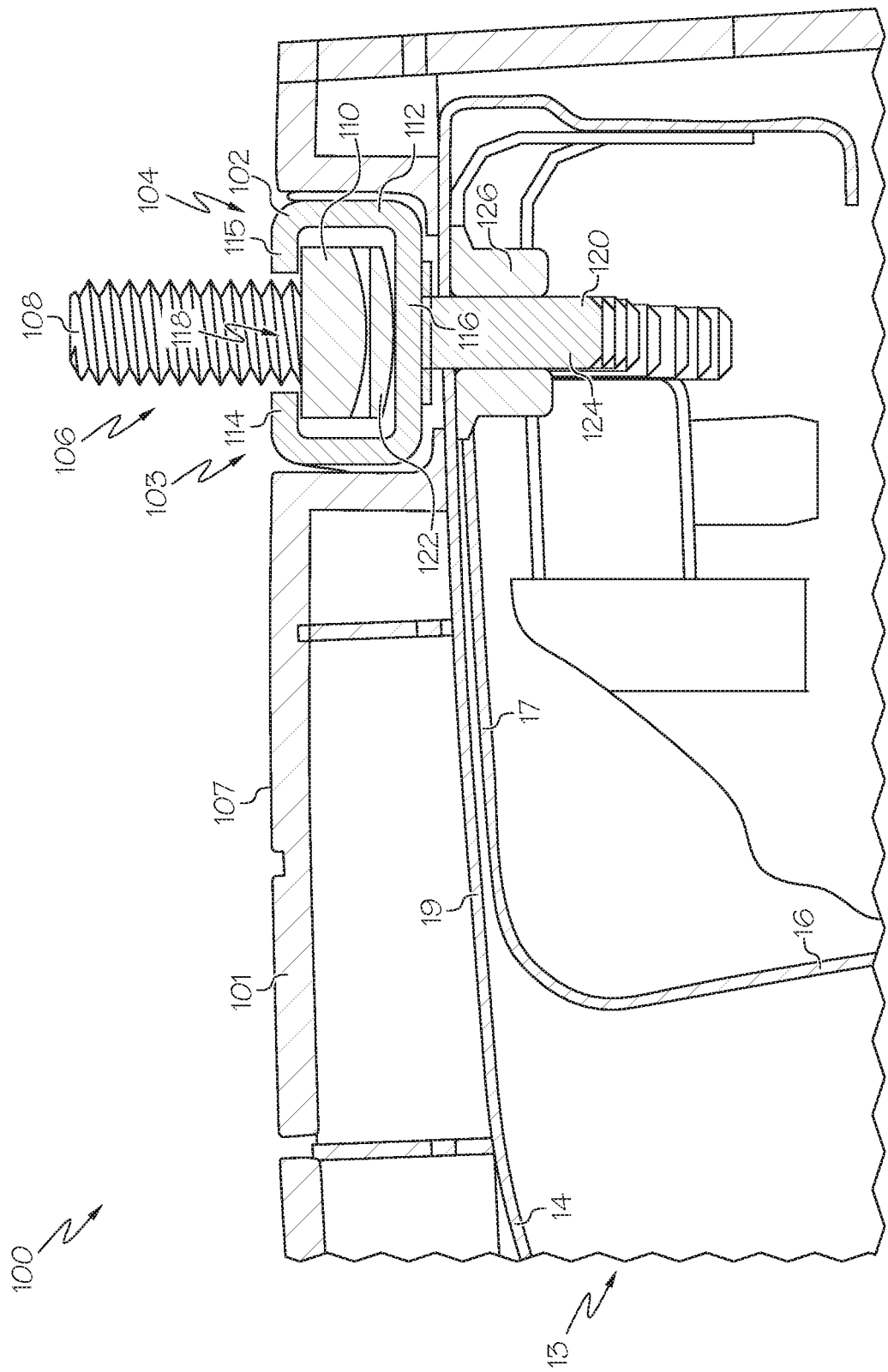
FIG. 4 depicts a cross sectional view of a truck bed sidewall of the vehicle of FIG. 3, according to one or more embodiments shown and described herein.

Referring now to FIGS. 3 and 4, the vehicle 10 includes a cap assembly 100. The cap assembly 100 includes a cap 101 that includes a recess 103 and an adaptor assembly 102 with an accessory channel 104 within the recess 103 for installing one or more accessory fasteners 106. The cap 101 may be installed on the truck bed sidewall 13 so that one or more truck bed accessories can be removably installed. The cap 101 may be a molded bed cap and retained to the truck bed sidewall 13 using one or more retention clips or other suitable mechanism(s). In some embodiments, the cap 101 may be constructed of any suitable material, for example polyethylene, or other plastic, aluminum, steel, and/or the like. The accessory channel 104 may be fit within the recess 103 such that the accessory channel 104 is proud (low profile), flush, or sub flush to a top surface 107 of the cap 101 such that use of the accessory channel 104 does not unnecessarily interfere with other traditional uses of the cap 101.

One or more of the adaptor assembly 102 and the accessory channel 104 may be an elongate structure that extends in the vehicle longitudinal direction substantially the length of the truck bed sidewall 13 or one or more portions thereof. One or more of the adaptor assembly 102 and the accessory channel 104 may be constructed of any suitable material, for example, aluminum, steel, plastic, and the like. One or more of the adaptor assembly 102 and the accessory channel 104 may be manufactured by any suitable process, for example, the accessory channel 104 may be roll formed, molded, extruded, fabricated or cast to form. The accessory channel 104 may extend substantially the entire length of the adaptor assembly 102 or portions thereof.

The adaptor assembly 102 is illustrated as an elongate slot extending continuously and substantially the entire length of the truck bed sidewall 13. However, it is contemplated that the adaptor assembly 102 may be any length and comprise any number of portions suitable for attaching truck bed accessories to the truck bed sidewall 13. For example, in truck beds that include a fender or other structure that extends along the truck bed sidewall 13, it may be advantageous to have two or more discrete sections of the adaptor assembly 102 on either side of the fender. Additionally, on vehicles with an extended truck bed, it may be advantageous to have multiple discrete sections of the adaptor assembly 102.

The one or more accessory fasteners 106 may be inserted into the accessory channel 104 for mounting external accessories such as cargo hook loops, cross bars, and other cargo management parts and may include a fastening portion 108 and a head portion 110. The head portion 110 may be slidably disposed within the accessory channel 104 and the fastening portion 108 may extend upward out of the accessory channel 104 and provide a connection location for one or more accessories. In some embodiments, the one or more accessory fasteners 106 comprise upside down bolts, but embodiments are not so limited.

Each of the accessory channels 104 may include a base wall 116 defining a length of the accessory channel 104, opposing sidewalls 112 defining a depth of the accessory channel 104 and extending from the base wall 116 to a top wall 114. The top wall 114 or portions thereof may include retaining flanges 115 extending from the sidewalls 112 to define a slot 118. The sidewalls 112 may be parallel to one another and perpendicular to the base wall 116. The retaining flanges 115 may be perpendicular to the sidewalls 112. The retaining flanges 115 may extend from the sidewalls 112 along the entire length of the accessory channel 104 or only portions thereof. The sidewalls 112, the slot 118, and the head portion 110 may be sized such that the head portion 110 is slidably held in the accessory channel 104 by the retaining flanges 115.

As shown in FIG. 3, the accessory channel 104 may include a discontinuity 105. Some embodiments of the accessory channel 104 may include one or more discontinuities similar to the discontinuity 105. The discontinuity 105 may be a portion of the accessory channel 104 where the slot 118 is wider than at other portions to permit insertion of the one or more accessory fasteners 106. In some embodiments, the width of the discontinuity 105 extends only into the retaining flanges 115 but it is contemplated that the width of the discontinuity may extend into the opposing sidewalls 112.

Referring to FIGS. 3 and 4, the one or more accessory fasteners 106 may be installed in the accessory channel 104 at the discontinuity 105. For example, the head portion 110 may be sized to be inserted in the accessory channel 104 at the discontinuity 105 but too large to be removed from the accessory channel 104 at other locations along the length of the accessory channel 104. Thus, when the accessory fastener 106 is positioned along the accessory channel 104, it may not be removed unless it is slid back to the discontinuity 105. The accessory channel 104 may comprise one or more interlocks at the discontinuity 105 to prevent uncontrolled removal of the one or more accessory fasteners 106 from the accessory channel 104 at the discontinuity 105.

Referring to FIG. 4, the interior sidewall 16 may include an interior sidewall top flange 17 and the exterior sidewall 14 may include an exterior sidewall top flange 19. The interior sidewall top flange 17 and the exterior sidewall top flange 19 may be substantially flat, parallel surfaces that extend longitudinally along the length of the truck bed sidewall 13 and provide a surface for connecting the cap assembly 100 using the one or more accessory fasteners 106.

Figure 5:
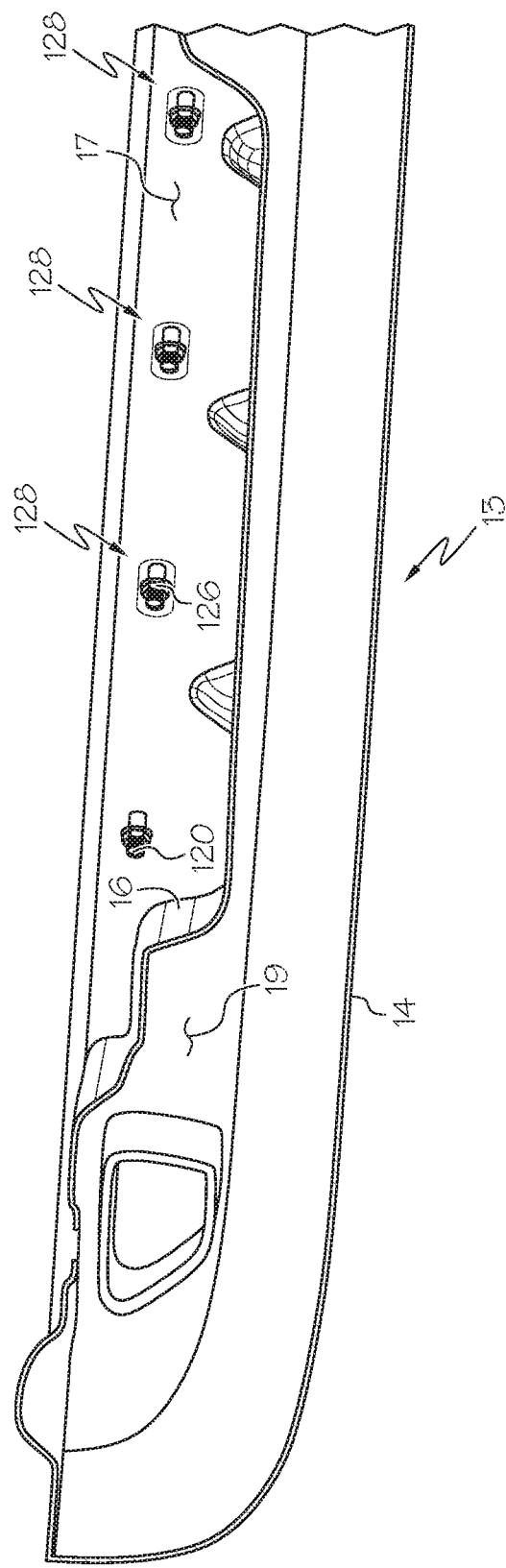
FIG. 5 depicts a bottom view of the cap assembly of FIG. 3, according to one or more embodiments shown and described herein.

Referring to FIGS. 4 and 5, the adaptor assembly 102 may be permanently coupled to the truck bed sidewall 13 using one or more adaptor fasteners 120. The one or more adaptor fasteners 120 may be weld studs or other suitable fasteners but embodiments are not so limited. It is contemplated that the accessory channel 104 may be coupled to the truck bed sidewall 13 using a countersunk or low profile head bolt, adhesion, over molded plastic, mechanical clips, or any other suitable mechanism. Each of the adaptor fasteners 120 may comprise an adaptor fastener head portion 122 and an adaptor fastener fastening portion 124 that may extend through the base wall 116, into the truck bed sidewall 13, and be fastened to the truck bed sidewall 13 using a retention nut 126. The adaptor fasteners 120 may extend into the truck bed sidewall 13 at one or more connection locations 128. In some embodiments, the accessory channel 104 may be coupled to the truck bed sidewall 13 at one or more original equipment manufacturer ("OEM") molded bed cap retention slots in the truck bed sidewall 13 (i.e., slots that are created on the factory floor immediately after or while the vehicle 10 is originally manufactured). However, in some embodiments, it may be necessary to craft new connection locations 128, such as retention holes, into one or more portions of the truck bed sidewall 13.

Figure 6:
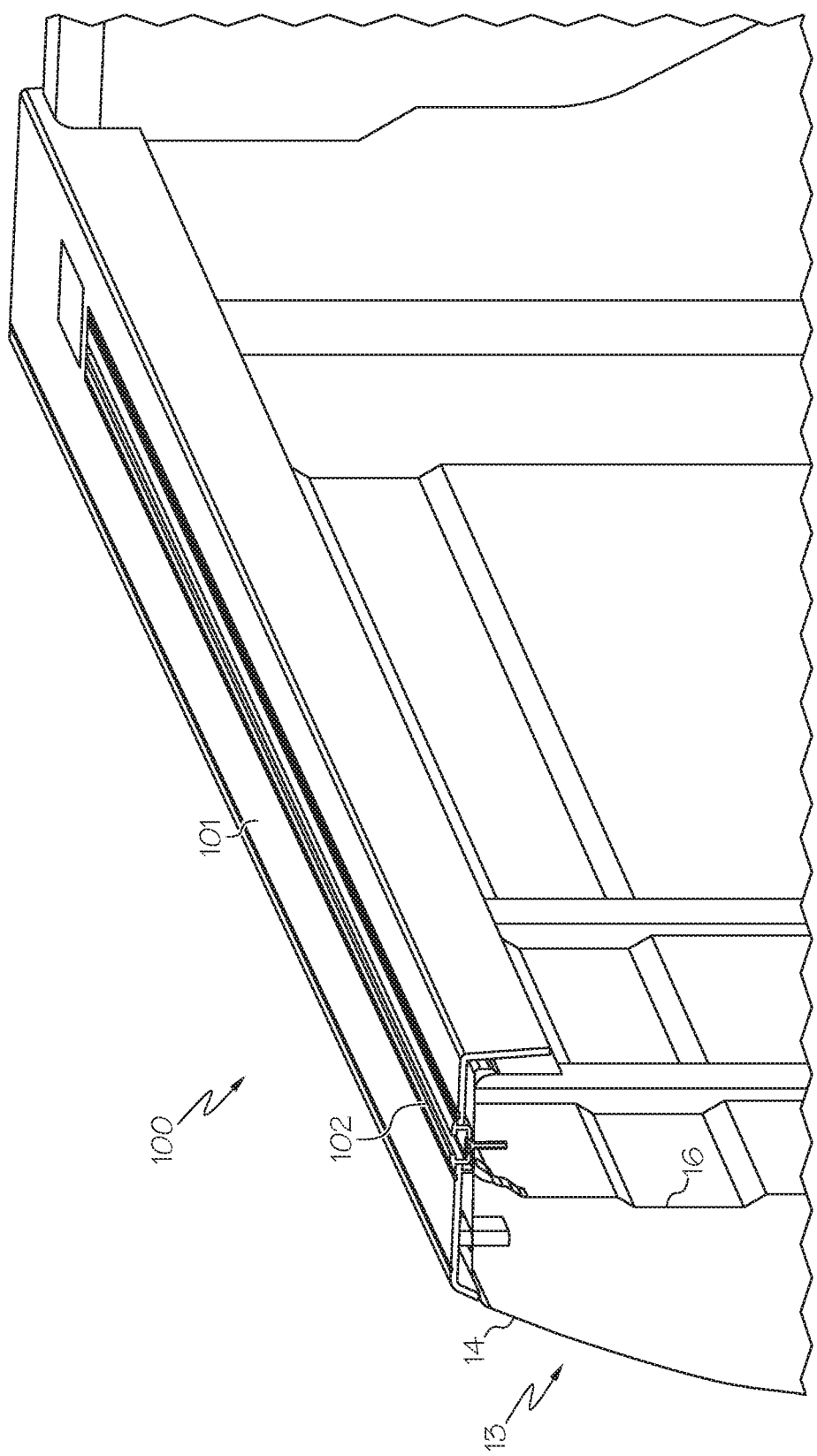
FIG. 6 depicts a perspective view of a cap assembly including an accessory channel for the vehicle of FIG. 1, according to one or more embodiments shown and described herein.
Figure 7:
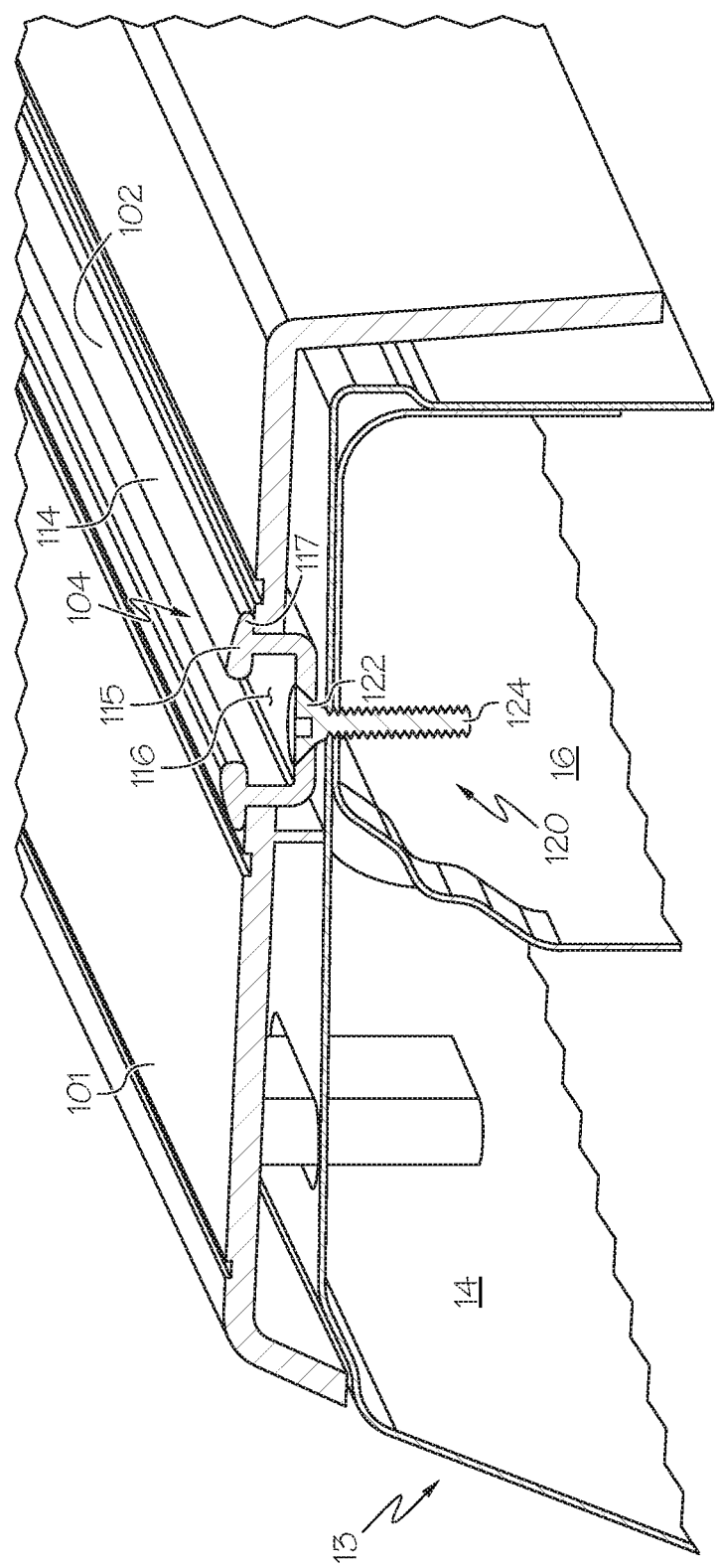
FIG. 7 depicts a perspective view of the cap assembly of FIG. 6, according to one or more embodiments shown and described herein.
Figure 8:
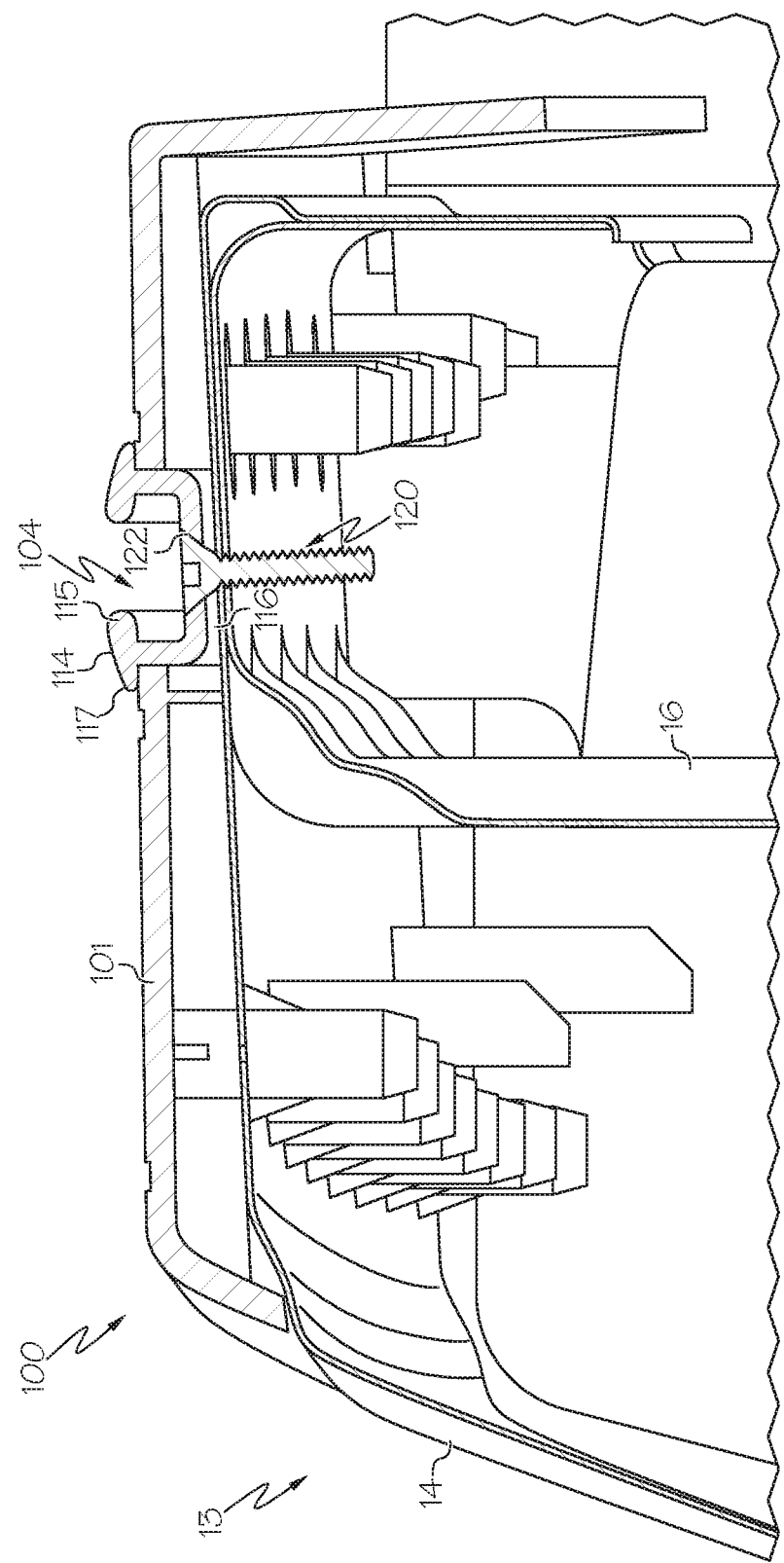
FIG. 8 depicts a cross-sectional view of the cap assembly of FIG. 6, according to one or more embodiments shown and described herein.

FIGS. 6-8 illustrate an embodiment of the cap assembly 100 that includes an adaptor fastener head portion 122 with a top surface that is flush with the base wall 116 of the accessory channel 104. The base wall 116 may include one or more bolt holes that are counter sunk into the base wall 116 to provide clearance for the adaptor fastener head portion 122 forming one or more countersunk holes. The adaptor fastener head portion 122 may have a flat profile. In some embodiments, the adaptor fastener head portion 122 may be proud (low profile), flush, or sub flush with the base wall 116 of the accessory channel 104. The flat or nearly-flat profile permits the head portion 110 of one or more accessory fasteners 106 (not shown for ease of illustration) to slide unobstructed along the entire longitudinal dimension of the accessory channel 104. In such an embodiment, it may be possible to have only one discontinuity for the entire length of the adaptor assembly 102 because the one or more accessory fasteners 106 can slide the entire length of the accessory channel 104. As shown in FIGS. 7 and 8, some embodiments of the cap assembly 100 include one or more collar flanges 117 that extend outwardly from the top wall 114 projecting over a portion of the top surface 107 of the cap 101.

Figure 9:
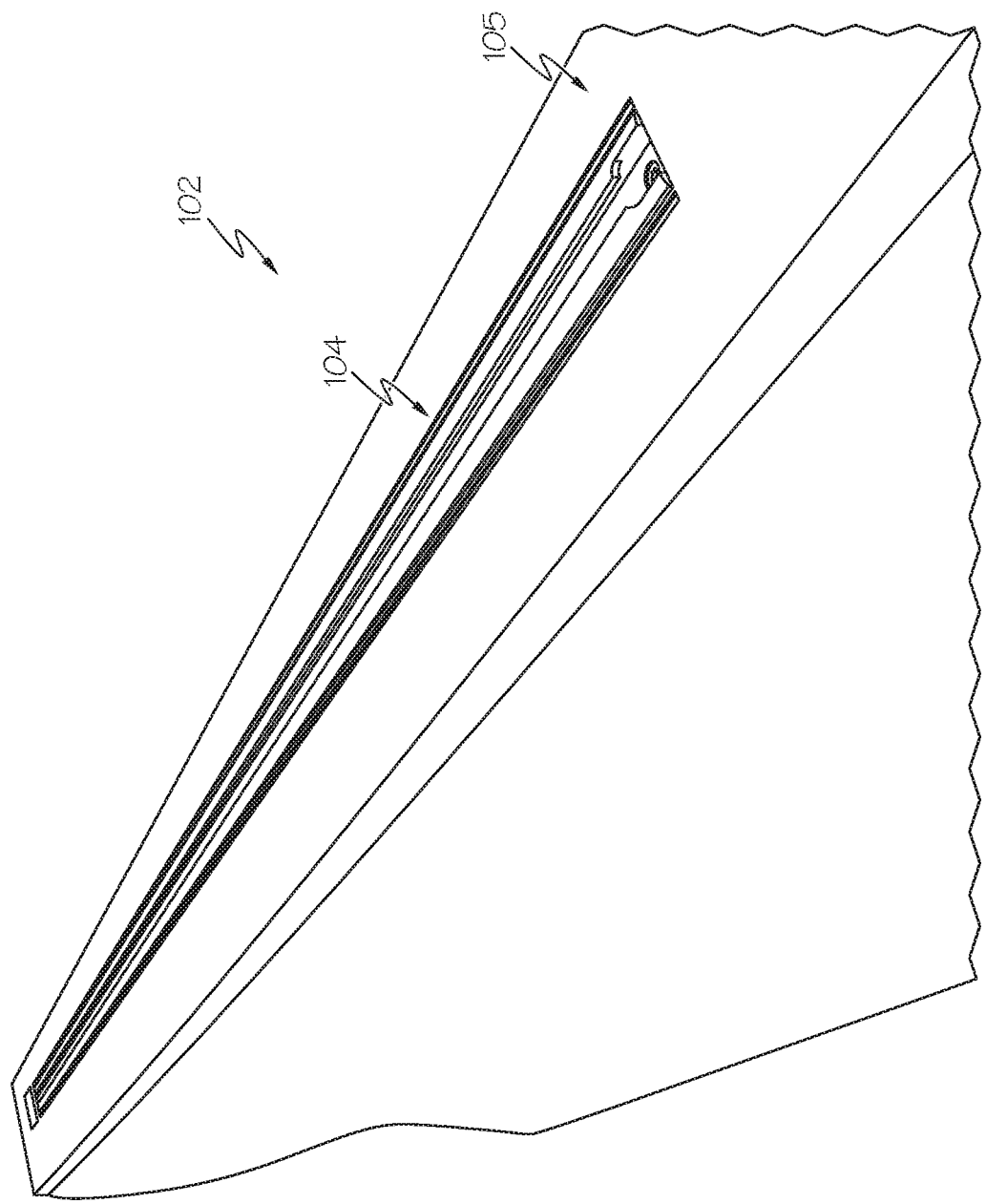
FIG. 9 depicts a perspective view of the cap assembly of FIG. 6, according to one or more embodiments shown and described herein.
Figure 10:
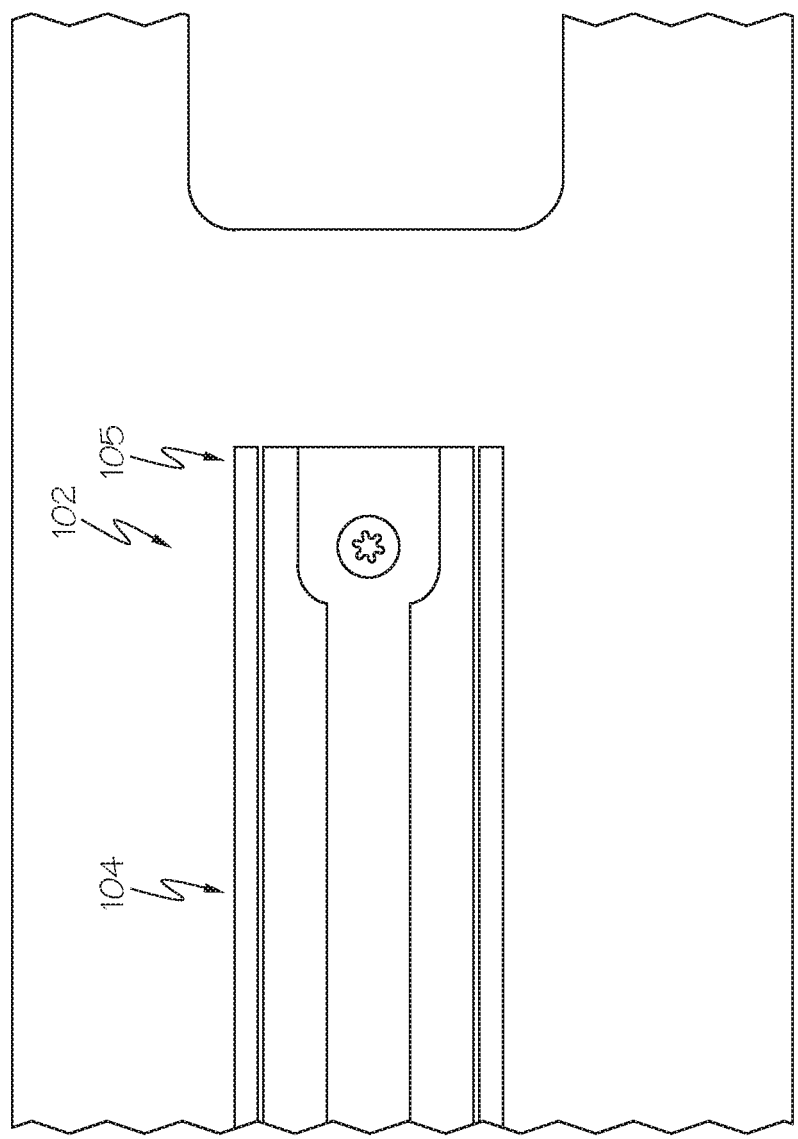
FIG. 10 depicts a top view of the cap assembly of FIG. 6, according to one or more embodiment shown and described herein.
Figure 11:
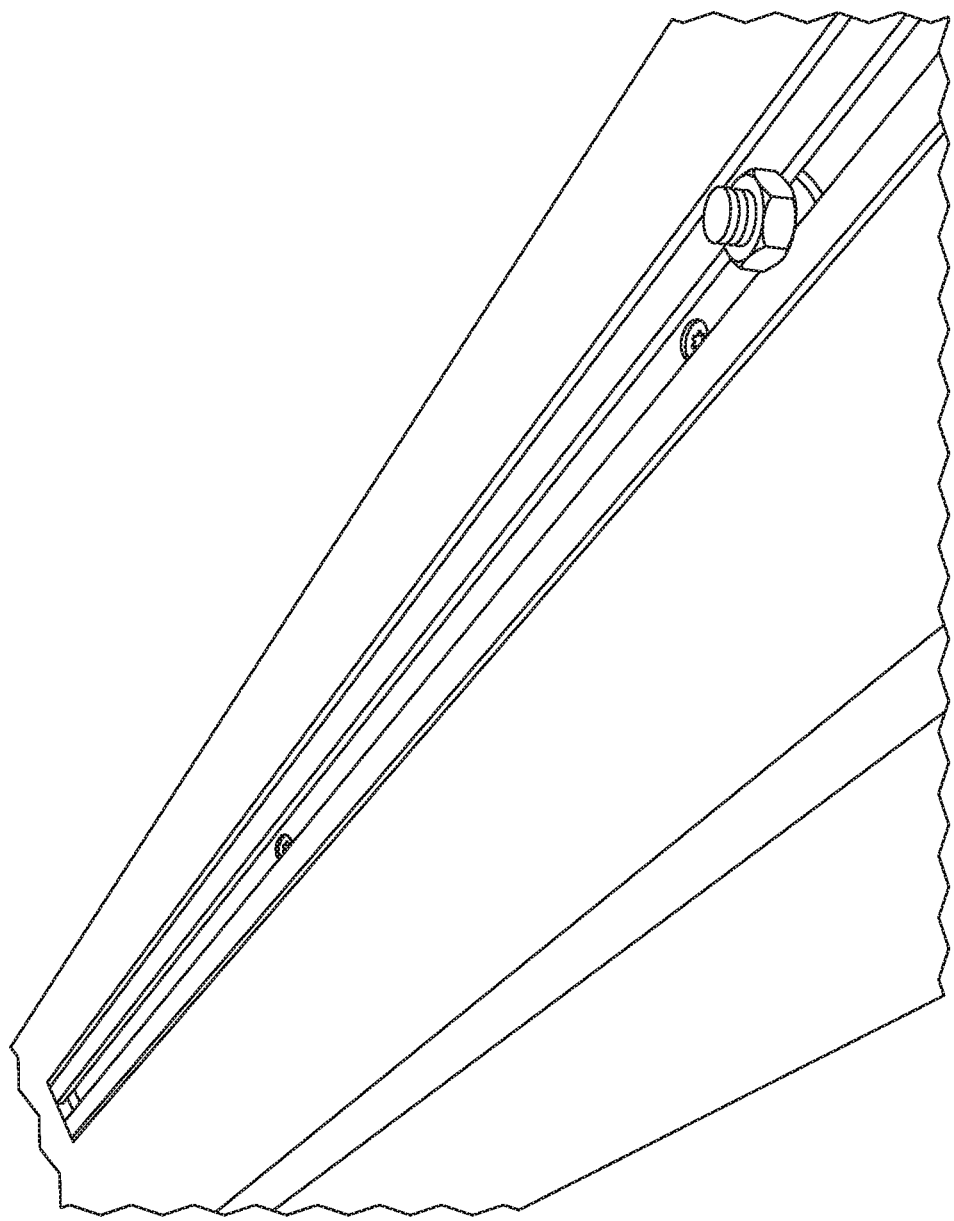
FIG. 11 depicts perspective view of the cap assembly of FIG. 6, according to one or more embodiments shown and described herein.
Figure 12:
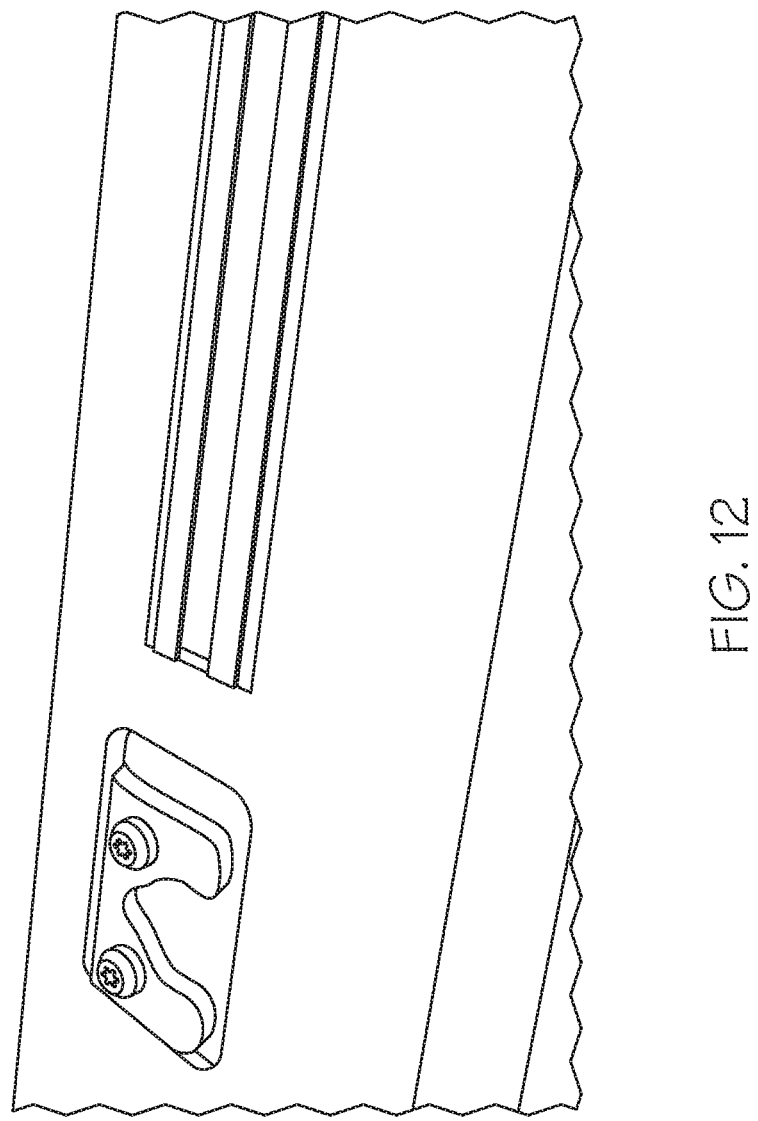
FIG. 12 depicts a perspective view of a portion of the cap assembly of FIG. 6, according to one or more embodiments shown and described herein.

Briefly referring to FIGS. 9 and 10, one example embodiment of an adaptor assembly 102 that includes the discontinuity 105 at the vehicle forward end of the adaptor assembly 102 as the only discontinuity in the accessory channel 104 is shown. In such an embodiment, the head portions 110 (FIG. 4) of the one or more accessory fasteners 106 (FIG. 4) are inserted in the accessory channel 104 at the discontinuity 105 and the one or more accessory fasteners 106 are then slidably positioned in the appropriate location within the accessory channel 104 for installing one or more accessories. Briefly referring to FIGS. 11 and 12, two examples of applications of alternative embodiments of the adaptor assembly 102 are shown.

Figure 13:
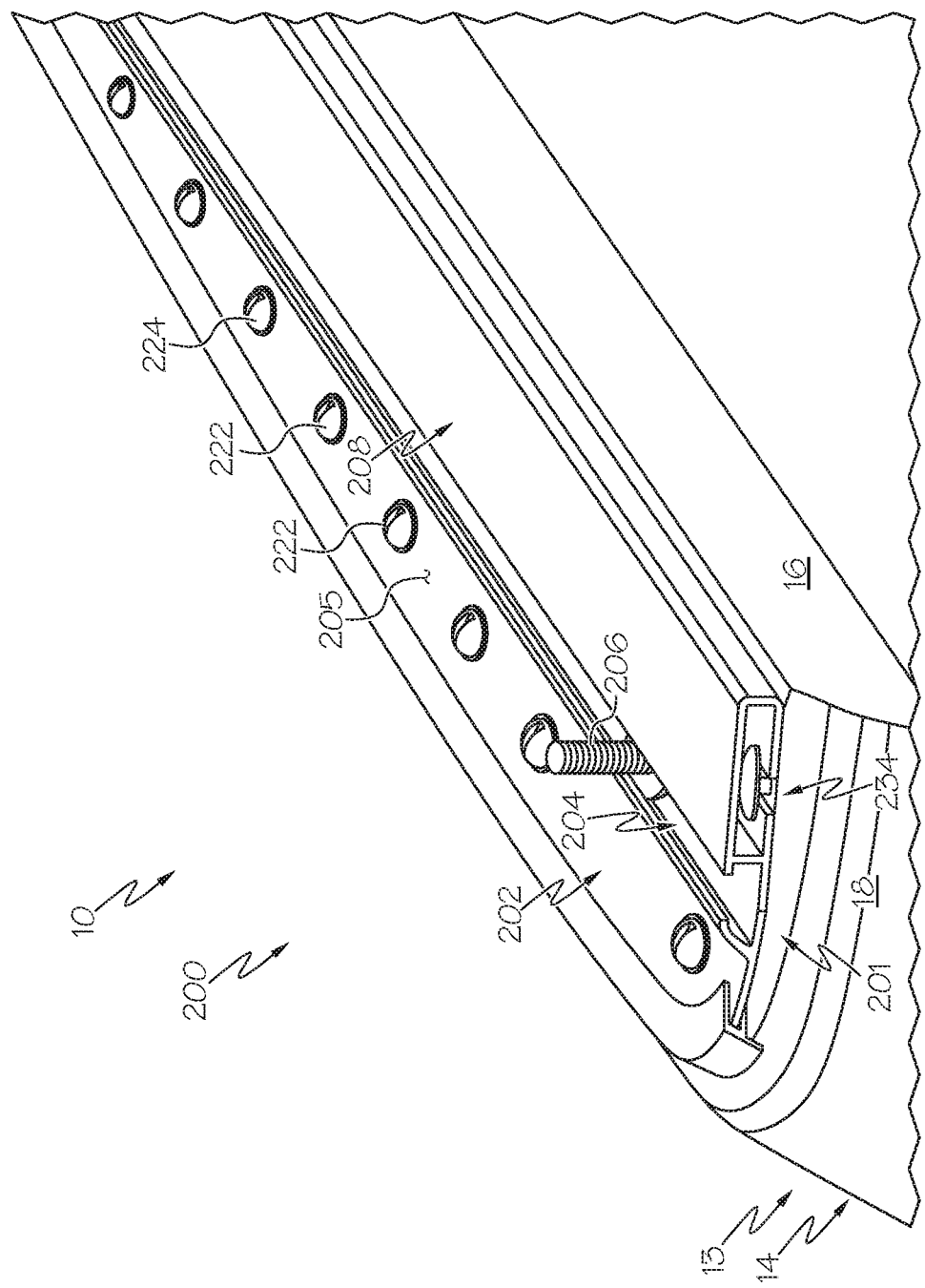
FIG. 13 depicts a perspective view of a cap assembly for the vehicle of FIG. 1, according to one or more embodiments shown and described herein.
Figure 14:
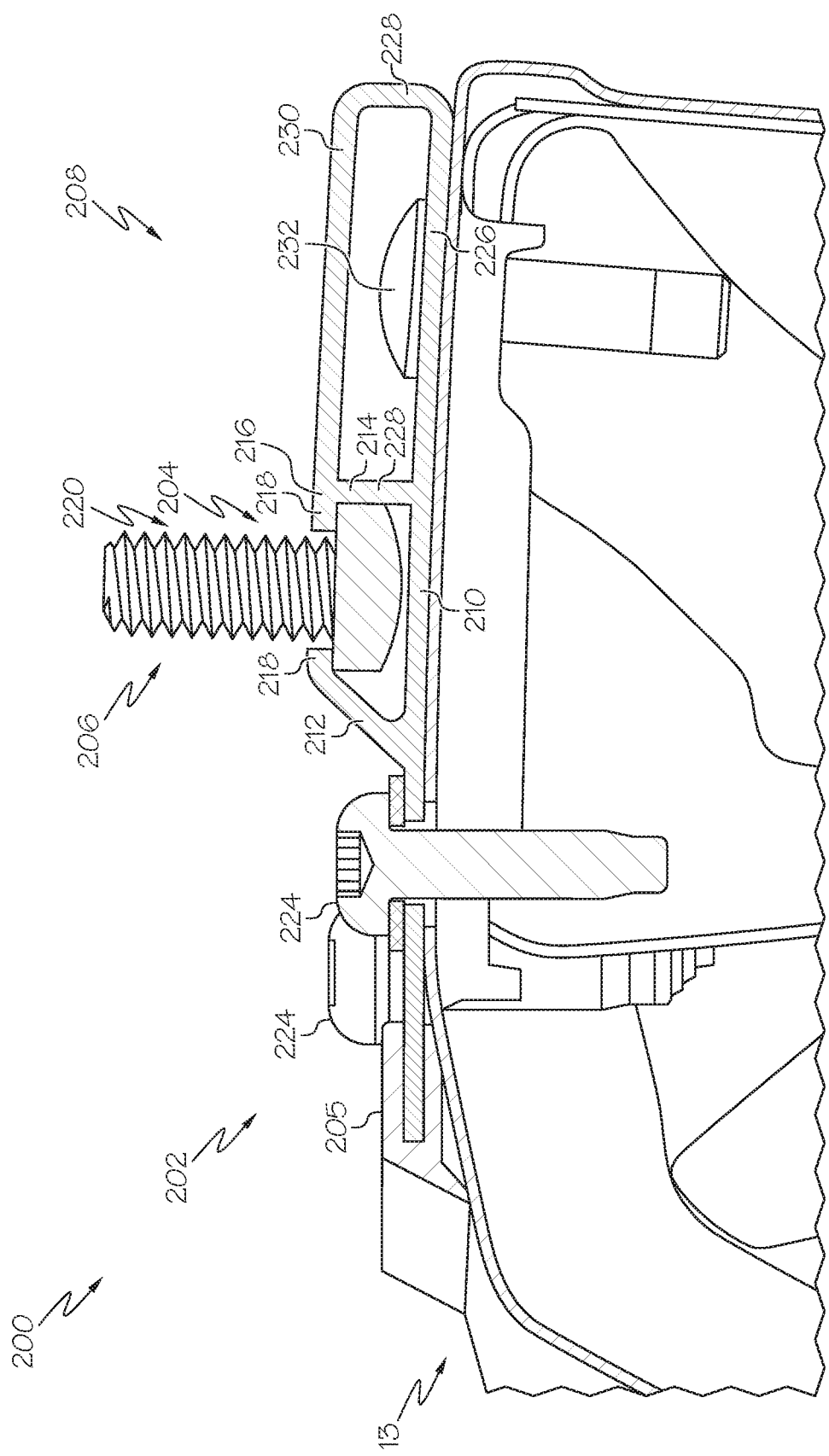
FIG. 14 depicts a cross sectional view of the cap assembly of FIG. 13, according to one or more embodiments shown and described herein.

FIGS. 13 and 14 illustrate an embodiment of a one-piece cap assembly 200. The one-piece cap assembly 200 may be a molded bed cap and retained to the truck bed sidewall 13 using one or more retention clips or other suitable mechanism(s). In some embodiments, the one-piece cap assembly 200 may be constructed of any suitable material, for example polyethylene, or other plastic, aluminum, steel, and/or the like.

The one-piece cap assembly 200 may include a planar portion 202 and an accessory channel 204. The planar portion 202 may include an exposed portion 205 and a fascia portion 208. One or more accessory fasteners 206 may be installed within the accessory channel 204 for coupling one or more accessories to the vehicle 10. In some embodiments, the accessory channel 204 may include an end opening 201 for inserting the one or more accessory fasteners 206 but embodiments may include other features for inserting the one or more accessory fasteners 206, such as one or more features similar to the discontinuity 105 discussed above.

The accessory channel 204 may include a base wall 210 that may extend along an entire length and/or an entire width of the accessory channel 204. Exterior sidewall 212 and interior sidewall 214 may extend upward from the base wall 210. In some embodiments, one or more of the exterior sidewall 212 and the interior sidewall 214 are perpendicular to the base wall 210. In some embodiments, one or more of the exterior sidewall 212 and the interior sidewall 214 extend diagonally from the base wall 210. The vertical components of the exterior sidewall 212 and the interior sidewall 214 may define a height of the accessory channel 204. A top wall 216 may extend between the exterior sidewall 212 and the interior sidewall 214. The top wall 216 may include retaining flanges 218 that may define a slot 220.

The exposed portion 205 may include one or more connection locations 222 for coupling the one-piece cap assembly 200 to the truck bed sidewall 13. One or more fasteners 224 may couple the one-piece cap assembly 200 to portions of the truck bed sidewall 13 through the exposed portion 205. The one or more connection locations 222 may be fabricated during the initial fabrication of the vehicle 10 or be added later, such as during a modification of the vehicle 10 to add one or more accessories to the truck bed 20.

The fascia portion 208 may include a fascia base wall 226 that defines a longitudinal dimension of the fascia portion 208. In some embodiments of the one-piece cap assembly 200, the fascia portion 208 extends the entire longitudinal dimension of the one-piece cap assembly 200, but embodiments are contemplated in which the fascia portion 208 comprises one or more discreet portions along the longitudinal dimension of the one-piece cap assembly 200. The fascia portion 208 includes sidewalls 228 that define a depth of the fascia portion 208. In some embodiments, the fascia portion 208 and the accessory channel 204 share the interior sidewall 214. A top wall 230 spans between the sidewalls 228.

The top wall 230 may cover one or more fascia portion fastening features 232 that extend between the fascia base wall 226 of the fascia portion 208 and the truck bed sidewall 13 to couple the one-piece cap assembly 200 to the truck bed sidewall 13. The fascia base wall 226 of the one-piece cap assembly 200 may include one or more notches 234 that permit insertion of one or more fasteners 224 through the fascia base wall 226 of the fascia portion 208 to couple the fascia portion 208 to the truck bed sidewall 13.

In a first aspect, a cap assembly for removably installing one or more accessories to a truck bed sidewall comprises: a cap; and an adaptor assembly that includes: an accessory channel that includes a base wall, a pair of opposing sidewalls, and a top wall comprising retaining flanges that define a slot; and one or more accessory fasteners comprising a fastening portion and a head portion; wherein the accessory channel is coupled to the cap, and the head portion of the one or more accessory fasteners is slidably positioned within the accessory channel and the fastening portion projects through the slot for connection to the one or more accessories.

In a second aspect, there is provided the cap assembly of aspect 1, further comprising one or more collar flanges that extend outwardly from the top wall and project over a portion of a top surface of the cap.

In a third aspect, there is provided the cap assembly of aspect 1 or 2, wherein the cap includes a recess that extends at least partially along a longitudinal dimension of the cap.

In a fourth aspect, there is provided the cap assembly of aspect 3, wherein the accessory channel is disposed within the recess.

In a fifth aspect, there is provided the cap assembly of any of aspects 1-4, wherein the accessory channel includes a discontinuity.

In a sixth aspect, there is provided the cap assembly of any of aspects 1-5, wherein the accessory channel is formed as a part of the cap.

In a seventh aspect, there is provided the cap assembly of any of aspects 1-6, wherein the accessory channel is coupled to the cap using one or more adaptor fasteners that comprise an adaptor fastener head portion and an adaptor fastener fastening portion at one or more connection locations.

In an eighth aspect, there is provided the cap assembly of claim 7, wherein the one or more connection locations comprise one or more countersunk holes and the head portion of the one or more adaptor fasteners are positioned within the one or more countersunk holes such that the head portion does not protrude above the base wall.

In a ninth aspect, there is provided the cap assembly of any of aspects 1-8, wherein the cap assembly is molded.

In a tenth aspect, there is provided the cap assembly of any of aspects 1-9, wherein the cap assembly is extruded.

In an eleventh aspect, there is provided the cap assembly of any of aspects 1-10, wherein the retaining flanges do not extend above a top surface of the cap.

In a twelfth aspect, a method of removably coupling an accessory to a truck bed sidewall comprising: inserting one or more accessory fasteners within an accessory channel formed in a cap of a cap assembly on the truck bed sidewall, positioning the one or more accessory fasteners along the accessory channel at a location for installing the accessory, and installing the accessory at the one or more accessory fasteners.

In a thirteenth aspect, there is provided the method of aspect 12, wherein the one or more accessory fasteners are inserted into the accessory channel at one or more discontinuities.

In a fourteenth aspect, there is provided the method of aspect 12 or 13, wherein: the accessory channel comprises a base wall, a pair of opposing sidewalls, and a top wall comprising retaining flanges that define a slot; the one or more accessory fasteners include a fastening portion and a head portion; and the head portion is sized to slide within the accessory channel and the fastening portion extends upward from the fastening portion through the slot for connection to the accessory.

In a fifteenth aspect, there is provided the method of any of aspects 12-14, wherein the cap assembly is molded.

In a sixteenth aspect, there is provided the method of any of aspects 12-15, wherein the cap assembly is extruded.

In a seventeenth aspect, a one-piece cap assembly for removably installing one or more accessories to a truck bed sidewall comprising: an accessory channel comprising: a base wall; an exterior sidewall; an interior sidewall; and a retaining flange that defines a slot for retaining an accessory fastener, and a fascia portion comprising: a fascia base wall; fascia sidewalls; and a top wall, wherein the fascia sidewalls extend between the fascia base wall and the top wall defining a depth of the fascia portion, and the fascia portion covers a fascia fastening feature that couples the one-piece cap assembly to the truck bed sidewall.

In an eighteenth aspect, there is provided the cap assembly of aspect 17, wherein the exterior sidewall extends diagonally upward from the base wall.

In a nineteenth aspect, there is provided the cap assembly of aspect 17 or 18, wherein the fascia portion extends an entire longitudinal length of the one-piece cap assembly.

In a twentieth aspect, there is provided the cap assembly of any of aspects 17-19, further comprising an exposed portion including one or more connection locations for coupling the one-piece cap assembly to the truck bed sidewall.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cap assembly for removably installing one or more accessories to a truck bed sidewall comprising:
    a cap comprising a recess that extends at least partially along a longitudinal dimension of the cap; and
    an adaptor assembly that includes:
        an accessory channel disposed within the recess of the cap, the accessory channel comprising a base wall, a pair of opposing sidewalls, and a top wall comprising retaining flanges that define a slot; and
        one or more accessory fasteners comprising a fastening portion and a head portion;
    wherein
    the head portion of the one or more accessory fasteners is slidably positioned within the accessory channel and the fastening portion projects through the slot for connection to the one or more accessories.

2. The cap assembly of claim 1 further comprising one or more collar flanges that extend outwardly from the top wall and project over a portion of a top surface of the cap.

3. The cap assembly of claim 1, wherein the accessory channel includes a discontinuity formed at a positioned along the retaining flanges such that the slot comprises a wider opening at the discontinuity as compared to a location along the retaining flanges spaced from the discontinuity.

4. The cap assembly of claim 1, wherein the accessory channel is coupled to the cap using one or more adaptor fasteners that comprise an adaptor fastener head portion and an adaptor fastener fastening portion at one or more connection locations.

5. The cap assembly of claim 4, wherein the one or more connection locations comprise one or more countersunk holes and the head portion of the one or more adaptor fasteners are positioned within the one or more countersunk holes such that the head portion does not protrude above the base wall.

6. The cap assembly of claim 1, wherein the cap assembly is molded.

7. The cap assembly of claim 1, wherein the cap assembly is extruded.

8. The cap assembly of claim 1, wherein the retaining flanges do not extend above a top surface of the cap.

9. A method of removably coupling an accessory to a truck bed sidewall comprising:
    inserting one or more accessory fasteners within an accessory channel positioned within a recesses formed in a cap of a cap assembly on the truck bed sidewall, wherein the recess extends at least partially along a longitudinal dimension of the cap,
    positioning the one or more accessory fasteners along the accessory channel at a location for installing the accessory, and installing the accessory at the one or more accessory fasteners.

10. The method of claim 9, wherein the one or more accessory fasteners are inserted into the accessory channel at one or more discontinuities.

11. The method of claim 9, wherein:
the accessory channel comprises a base wall, a pair of opposing sidewalls, and a top wall comprising retaining flanges that define a slot; and
the one or more accessory fasteners include a fastening portion and a head portion; and
the head portion is sized to slide within the accessory channel and the fastening portion extends upward from the fastening portion through the slot for connection to the accessory.

12. The method of claim 9, wherein the cap assembly is molded.

13. The method of claim 9, wherein the cap assembly is extruded.

14. A one-piece cap assembly for removably installing one or more accessories to a truck bed sidewall comprising:
an accessory channel comprising:
a base wall;
an exterior sidewall;
an interior sidewall; and
a retaining flange that defines a slot for retaining an accessory fastener, and
a fascia portion comprising:
a fascia base wall;
fascia sidewalls; and
a top wall, wherein
the fascia sidewalls extend between the fascia base wall and the top wall defining a depth of the fascia portion, and
the fascia portion covers a fascia fastening feature that couples the one-piece cap assembly to the truck bed sidewall.

15. The one-piece cap assembly of claim 14, wherein the exterior sidewall extends diagonally upward from the base wall.

16. The one-piece cap assembly of claim 14, wherein the fascia portion extends an entire longitudinal length of the one-piece cap assembly.

17. The one-piece cap assembly of claim 14 further comprising an exposed portion including one or more connection locations for coupling the one-piece cap assembly to the truck bed sidewall.

* * * * *